Feb. 19, 1957    M. CAMRAS    2,781,688
MOTION PICTURE FILM
Filed Aug. 1, 1951
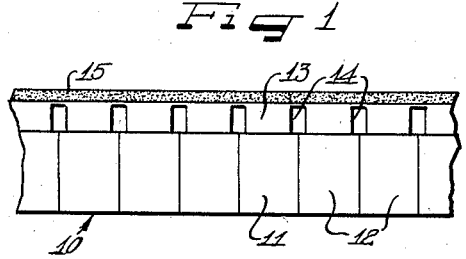
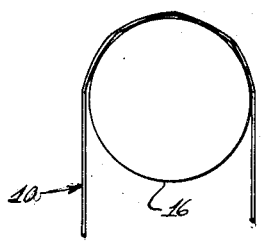
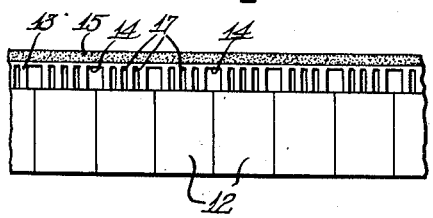
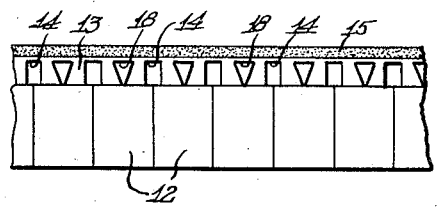
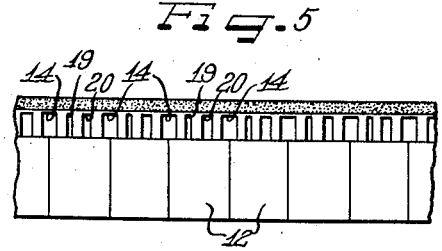
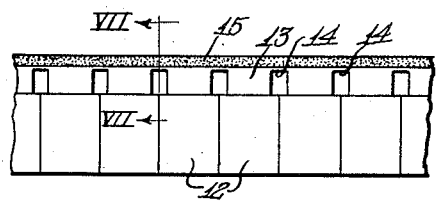
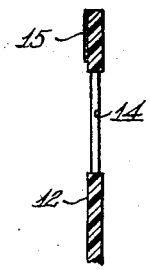
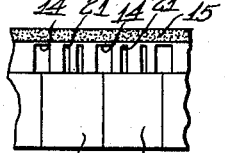
Inventor
MARVIN CAMRAS
by *Hill, Sherman, Meroni, Gross & Simpson*
Attys.

United States Patent Office 2,781,688
Patented Feb. 19, 1957

2,781,688

MOTION PICTURE FILM

Marvin Camras, Chicago, Ill., assignor to Armour Research Foundation of Illinois Institute of Technology, Chicago, Ill., a corporation of Illinois Application August 1, 1951, Serial No. 239,818

1 Claim. (Cl. 88—16.2)

The present invention is concerned with an improved type of motion picture film including a magnetic sound track.

Motion picture films containing magnetic sound tracks in place of optical sound tracks are coming into more and more general use. The ease with which the sound may be recorded on a magnetic sound track, because of the economy and the relative simplicity of the equipment involved, and the very definite advantages offered by the possibility of erasing a magnetically recorded sound track are contributing factors in this trend toward the greater use of magnetically recorded sound tracks on motion picture films.

Motion picture films having magnetically recorded sound tracks are ordinarily employed in the same type of motion picture equipment as employed in the case of motion picture films having optically recorded sound tracks. Such machines conventionally employ a driven sprocket to supply motive power to the film as the film is pulled through the gate mechanisms. Sprocket holes are provided in the motion picture film adjacent the picture area to engage the teeth of the sprocket. In the case of 8 mm. and 16 mm. film, the sprocket holes on the film are immediately adjacent the picture area, so that the only space available for the incorporation of a magnetically recorded sound track is the extreme marginal edge of the film beyond the sprocket holes.

One of the difficulties in effectively reproducing recorded intelligence from a magnetically recorded sound track on a motion picture film is the objectionable flutter which occurs because of uneven contact between the electromagnetic transducer head with the sound track as the film is trained around the circumference of a capstan. I have found that this flutter, which is subsequently reproduced as an objectionable noise in the audio reproducing system, is primarily caused by the fact that the motion picture film does not conform accurately to the circumference of the capstan against which the film rides. Instead of being bent into a perfectly circular loop around the capstan, the film, due to the perforations of the sprocket holes, is bent into a polygonal shape around the periphery of the capstan. As the electromagnetic transducer head contacts the magnetic sound track at the edge of the film while the film is moving along the periphery of the capstan, the polygonal configuration of the film edge causes uneven contact with the head, giving rise to the objectionable flutter. I have further found that this flutter can be substantially or completely eliminated by adjusting the flexibility of the motion picture film in the region of the sprocket holes. While the present invention will be described particularly in connection with motion picture films having magnetic sound tracks, the teachings of the present invention will also be applicable to films having optically recorded sound tracks where flutter is a problem.

An object of the present invention is to provide a motion picture film having a sound track on an edge thereof which will conform more accurately to the periphery of a capstan.

Another object of the present invention is to provide a motion picture film having areas of increased flexibility in the region of the film between the picture area and the magnetic sound track.

Another object of the present invention is to provide an improved motion picture film in which the area of the film in which the sprocket holes are disposed is made more flexible, thereby eliminating the flutter commonly associated with the film as it rides over the periphery of the capstan.

Motion picture film of the present invention can be treated in a variety of manners to increase the flexibility of the portion of the film carrying the sprocket holes. One of the simplest means for accomplishing the result is to punch additional holes or slots between the successive sprocket holes. Preferably, these additional perforations are made of a different geometric configuration and are spaced differently than the spacing of the sprocket holes, so that the added perforations are less susceptible to catching in the teeth of the sprocket.

Alternatively, the region of the motion picture film carrying the sprocket holes can be made thinner by means of shaving or embossing to provide an area of increased flexibility. As a further alternative, the intermediate region of the film carrying the sprocket holes can be made more flexible by adding a plasticizing agent to this area thereby making the sprocket hole area of substantially less rigidity than the remainder of the film.

A further description of the present invention will be made in connection with the attached sheet of drawings in which:

Figure 1 is a plan view of a conventional motion picture film including a magnetic sound track;

Figure 2 is a fragmentary view illustrating the polygonal effect occurring when the film of Figure 1 is trained around the periphery of the capstan;

Figure 3 is an improved motion picture film including a plurality of spaced slots between adjacent sprocket holes;

Figure 4 is another modification in which apertures of different geometric shape are employed between the sprocket holes;

Figure 5 is another embodiment of the invention in which apertures of different sizes are located between adjacent sprocket holes;

Figure 6 is a plan view of a further modified form of the film of the present invention;

Figure 7 is a greatly enlarged, cross-sectional view taken substantially along the line VII—VII of Figure 6;

Figure 8 is a plan view of a still further modified form of the present invention.

As shown on the drawings:

In Figure 1, there is shown a conventional type of 8 mm. or 16 mm. motion picture film 10 including a base 11 of film material such as cellulose acetate, cellulose nitrate and the like, coated with a photographic emulsion. This film is divided into a picture area containing a plurality of consecutive frames 12 and the intermediate area 13 having a plurality of rectangular sprocket holes 14 for engagement with a sprocket drive means on the motion picture projector. In the case of 8 mm. or 16 mm. film a single sprocket hole is located between successive frames of the picture area.

At the marginal edge of the film 10, a magnetic sound track 15 is securely attached. This sound track may consist of finely divided, discrete magnetic particles which may be of any suitable magnetic material such as magnetic alloys or $Fe_3O_4$ or other magnetic oxides of iron treated to achieve a high coercive force. In sound tracks of this type, the particle size of the magnetic particles is on the order of 6 microns or less, and the particles are embedded in a resinous binder which secures the particles to the base.

In Figure 2, I have illustrated the effect which occurs when a film of the type shown in Figure 1 is trained about the periphery of a capstan 16. As clearly shown in Figure 2, the film 10 because of the presence of the perforations 14 between each frame 12 does not conform accurately with the periphery of the capstan 16, but rather the film is bent into a polygonal configuration, the length of the sides of the polygon being equal to the distance between the sprocket holes 14. The failure of the film 10 to conform accurately with the cylindrical surface of the capstan 16 causes uneven velocity and uneven contact with an electromagnetic transducer head which is arranged to contact the magnetic sound track 15 as the film 10 is pulled about the periphery of the capstan 16. The result is the production of a flutter which is reproduced in the audio reproduction system as an audible note of a relatively low frequency. To minimize substantially the flutter produced by conventional types of motion picture films shown in Figure 1, the flexibility of the intermediate portion 13 carrying the sprocket holes and disposed between the picture area and the magnetic sound track 15 is increased relative to the remainder of the film body. Several different types of modified motion picture film in which increased flexibility is achieved are illustrated in the drawings in Figures 3 to 8. In Figure 3, the spaces between the adjoining sprocket holes 14 are provided with generally rectangular, relatively narrow slits 17 to increase the flexibility of the intermediate portion 13. When apertures are provided between the sprocket holes for the purpose of increasing the flexibility of the film in that region, it is desirable that the added apertures have a different geometric configuration than the sprocket holes themselves, as is the case in using the relatively narrow slits 17. In this way, the film is less likely to be incorrectly threaded on the projector, as the teeth of the sprocket wheels are not readily received within the slits 17. On the other hand, for simplicity, extra sprocket holes of the same kind may be added between the existing sprocket holes to increase flexibility. In 16 mm. film, there is sufficient space for three such extra perforations between the regular sprocket holes. On 8 mm. film, there is space for one additional perforation between adjoining sprocket holes.

Similarly, in the film structure of Figure 4, the intermediate area 13 carrying the sprocket holes 14 is made more flexible than the remainder of the film body by providing a series of triangularly shaped apertures 18 between adjoining sprocket holes 14. The triangular apertures 18 are shown for purposes of illustration only, as it will be appreciated that apertures of other shapes may function as effectively. For example, the apertures may be circular, or in the shape of a parallelogram or a diamond.

In the film structure of Figure 5, the flexibility of the intermediate portion is increased by providing a plurality of apertures including a relatively narrow slit 19 and a relatively wider slit 20 between adjoining sprocket holes 14. As an alternative embodiment, the positions of the relatively narrow slit 19 and the relatively wider slit 20 may be interchanged between adjoining sprocket holes 14 or their spacing and size may change progressively. This modified arrangement has the advantage that no definite frequency of flutter is set up by the added perforations to be reproduced by the audio system. If any disturbance should remain the resulting flutter is at a higher frequency than if the film were unmodified, making the audible noise less noticeable to the ear. Whenever additional perforations are employed to increase the flexibility of the film, it is preferable that at least one half of the film material in the sprocket region be removed. Thus, along a line bisecting the perforations, one half or less of the material is film, and the remainder is void space. It should also be noted that the preferred spacing between the perforations is substantially less than the long dimension of a single perforation, providing a series of elongated flexible fingers adjacent the track.

Instead of providing apertures between adjoining sprocket holes of the film, the flexibility of the intermediate area carrying the sprocket holes can be increased by reducing the thickness of the film in that area. This reduction in mass may be accomplished by cutting, embossing and the like. Alternatively, the flexibility of the sprocket hole area may be increased by adding a plasticizing agent to the film in that area.

In Figure 6, and the greatly enlarged cross-sectional view of Figure 7, I have illustrated a film in which the intermediate area 13 carrying the sprocket holes 14 is reduced in thickness as compared to the remainder of the film body. The reduction in mass effectively increases the flexibility of the film in that area and permits better conformance of the film to the periphery of the capstan.

In Figure 8, the film is provided with slits 21 between adjoining sprocket holes 14, the distance between the slits 21 varying along the length of the film between adjoining sprocket holes. This progressive increase and decrease in the distance between the slits 21 also prevents setting up any definite flutter frequency in the reproducing unit.

From the foregoing, it will be apparent that the motion picture films of the present invention are substantially more flexible in the sprocket hole area than conventional films, and that this added flexibility permits the film to conform more accurately to the surface of the capstan, thereby permitting more uniform and steadier tracking of the magnetic sound track by the electric magnetic reproducer. The sound track portion is relatively stiff compared to the intermediate area, and is relatively undistorted by the perforations.

It will be understood that modifications and variations may be effected without departing from the scope of the novel concepts of the present invention.

I claim as my invention:

A motion picture film comprising a film base a picture area on said film base extending longitudinally thereof a magnetic particle sound track on said film base also extending longitudinally thereof, and a longitudinally extending substantially uniform width sprocket hole portion adjacent to said sound track, aligned regularly spaced uniform sprocket holes of preselected geometrical configuration in said portion adapted to be engaged by driving means to drive said film, and further relatively narrower rectangular apertures between said sprocket holes and in said portion aligned with said sprocket holes and with each other, said further rectangular apertures each having a length transversely of said film base and said portion thereof substantially the same as the transverse dimension of said sprocket holes but being different in geometrical configuration from said sprocket holes to increase the longitudinal regularity of the flexibility of said film base and particularly the sound track thereof to permit substantially smooth relative motion between the sound track and a sound reproducing head, said further apertures being plural in number between adjacent sprocket holes and being all of substantially the same geometrical configuration.

References Cited in the file of this patent
UNITED STATES PATENTS

| | | |
|---|---|---|
| 1,489,988 | Dickinson | Apr. 8, 1924 |
| 1,896,836 | Byron | Feb. 7, 1933 |
| 2,048,497 | Elmer et al. | July 21, 1936 |
| 2,118,519 | Noack | Mar. 24, 1938 |